United States Patent
Ha et al.

(10) Patent No.: US 8,606,034 B2
(45) Date of Patent: Dec. 10, 2013

(54) APPARATUS FOR IMPROVING SHARPNESS OF IMAGE

(75) Inventors: Joo Young Ha, Gyunggi-do (KR); Won Tae Choi, Gyunggi-do (KR); Bong Soon Kang, Busan (KR); Byung Hyun Kim, Busan (KR); Joo Hyun Kim, Gyunggi-do (KR); Sun Mi Sin, Gyunggi-do (KR); Won Woo Jang, Busan (KR); Hak Yong Han, Busan (KR); Gi Dong Lee, Busan (KR)

(73) Assignees: Samsung Electro-Mechanics Co., Ltd., Gyunggi-Do (KR); Dong-A University Research Foundation for Industry-Academy Cooperation, Busan (KR)

( * ) Notice: Subject to any disclaimer, the term of this patent is extended or adjusted under 35 U.S.C. 154(b) by 312 days.

(21) Appl. No.: 13/092,438

(22) Filed: Apr. 22, 2011

(65) Prior Publication Data

US 2012/0033885 A1    Feb. 9, 2012

(30) Foreign Application Priority Data

Aug. 6, 2010 (KR) .......................... 10-2010-0076115

(51) Int. Cl.
*G06K 9/40* (2006.01)
(52) U.S. Cl.
USPC ............................ 382/260; 382/263; 382/266
(58) Field of Classification Search
USPC ............. 348/E9.042; 382/254, 260, 263, 266
See application file for complete search history.

(56) References Cited

U.S. PATENT DOCUMENTS

2010/0014771 A1 *   1/2010   Kim et al. .................. 382/263

FOREIGN PATENT DOCUMENTS

| JP | 2006080767 A | * | 6/2006 |
|---|---|---|---|
| KR | 1020080018690 A | | 2/2008 |
| KR | 102008006645 A | | 7/2008 |
| KR | 1020080093769 A | | 10/2008 |
| KR | 1020100009168 A | | 1/2010 |

OTHER PUBLICATIONS

Korean Office Action 10-2010-0076115 issued Jul. 28, 2011.

* cited by examiner

*Primary Examiner* — Gregory F Cunningham
(74) *Attorney, Agent, or Firm* — Lowe Hauptman & Ham, LLP (57) ABSTRACT

There is provided an apparatus for improving the sharpness of an image, which may prevent occurrence of distortion of an image in an edge enhancement process of the image by applying an active weight in accordance with a two-dimensional (2D) high pass filtering value of the image. The apparatus may include: a 2D high pass filter outputting a high frequency element value for the luminance values of pixels of an input image; a weight generating unit generating a weight changed depending on a magnitude of the high frequency element value; a weight applying unit applying the weight to the high frequency element value; and an edge enhancement image generating unit adding, to the luminance values of the pixels of the input image, the high frequency element value to which the weight is applied to thereby output an image of which an edge is enhanced.

10 Claims, 10 Drawing Sheets

APPARATUS FOR IMPROVING SHARPNESS OF IMAGE

CROSS-REFERENCE TO RELATED APPLICATIONS

This application claims the priority of Korean Patent Application No. 10-2010-0076115 filed on Aug. 6, 2010, in the Korean Intellectual Property Office, the disclosure of which is incorporated herein by reference.

BACKGROUND OF THE INVENTION

1. Field of the Invention

The present invention relates to an apparatus for improving the sharpness of an image, and more particularly, to an apparatus for improving the sharpness of an image, which may apply an active weight in accordance with a two-dimensional (2D) high pass filtering value of the image, thereby preventing the occurrence of image distortion in an edge enhancement process of the image.

2. Description of the Related Art

In general, the human visual sensation, capable of recognizing an image displayed by an image apparatus, may prefer an image having high sharpness. To satisfy the preference of the human visual sensation, various image sharpness improvement schemes which may be applied to an image apparatus such as a digital camera, a television (TV), a mobile phone equipped with a camera, and the like may be adopted. Of the image sharpness improvement schemes, an edge enhancement scheme in which an existing edge (contour) of a digital image is more enhanced may be widely used.

As a typical edge enhancement scheme, a scheme in which a filtering value generated by applying two dimensional (2D) high pass filtering (HPF) to an entire image is applied to an original image and a scheme in which a filtering value generated by applying 2D-HPF based on each of ascertained characteristics of an edge (for example, directivity) is applied to the original image may be proposed.

In the former edge enhancement scheme, 2D-HPF may be applied to the entire image, and then the entire image may be added to the original image. However, excessive edge enhancement may be carried out in a part having a strong edge element, leading to the occurrence of overshooting and undershooting, thereby causing a ringing phenomenon in which a white edge is generated in an edge region of an object. Also, even minute blurring (background noise) occurring in a flat region of the image due to internal noise of the image apparatus may be enhanced, thereby making the image unnatural.

In the latter edge enhancement scheme, directivity, which is one of the characteristics of the edge, may be ascertained, and a 2D-HPF scheme suitable for the directivity of each of the edges may be selectively applied. Specifically, the edge directivity such as a horizontal direction, a vertical direction, a left diagonal direction, a right diagonal direction, no-directivity, and the like may be ascertained, a 2D-HPF scheme suitable for each of directivities may be selectively applied to generate a filtering value, and the generated filtering value may be applied to the input image. In the latter edge enhancement scheme, the 2D-HPF differing depending on a priority for a type of an ascertainment formula and an ascertained result and depending on the directivity may be required along with an increase in a number of types of the edge directivity, and thereby a size of a system for the edge enhancement may be increased. Also, in the latter edge enhancement scheme, an intensity of the ascertained edge may not be considered although the edge directivity may be ascertained, and therefore a ringing phenomenon may occur in a strong edge part, similar to the former edge enhancement scheme. Also, since 2D-HPF schemes which are different from each other, depending on the directivity thereof, may be applied for each pixel, discontinuous edge enhancement may be carried out, causing a problem in a natural sharpness improvement.

Accordingly, there is the need for a method for preventing an image quality-deterioration phenomenon such as distortion or ringing occurring when the edge enhancement scheme is applied for the purpose of an improvement in the sharpness of an image.

SUMMARY OF THE INVENTION

An aspect of the present invention provides an apparatus for improving the sharpness of an image, which may enhance edges included in an image while preventing the occurrence of an image quality-deterioration phenomenon such as distortion or ringing, to thereby enable natural sharpness improvement of the image to be realized.

According to an aspect of the present invention, there is provided an apparatus for improving the sharpness of an image, the apparatus including: a two-dimensional (2D) high pass filter outputting a high frequency element value for the luminance values of pixels of an input image; a weight generating unit generating a weight changed depending on a magnitude of the high frequency element value; a weight applying unit applying the weight to the high frequency element value; and an edge enhancement image generating unit adding, to the luminance values of the pixels of the input image, the high frequency element value to which the weight is applied to thereby output an image of which an edge is enhanced.

An absolute value of the weight generated in the weight generating unit may be increased during which an absolute value of the high frequency element value is increased up to a preset first reference value, and may be reduced during which the absolute value of the high frequency element value is increased beyond the first reference value.

The weight generated in the weight generating unit may be determined by the following Equation 1, which is represented as $$w = -a(h-R)^2 + P, \text{ if } 0 \le h \le 2R$$

$$w = a(h+R)^2 - P, \text{ if } -2R \le h < 0$$

$$w = 0, \text{ if } h > 2R \text{ or } h < -2R \qquad \text{Equation 1,}$$

In Equation 1, w denotes weight, h denotes a high frequency element value, and each of a, R, and P denotes an arbitrary constant having a positive value.

The weight generated in the weight generating unit may be maintained to be constant at a second reference value when the absolute value of the weight is greater than the second reference value.

The apparatus may further include an edge region determination unit determining whether each of the pixels of the input image is included in an edge region in accordance with a luminance deviation between each of the pixels of the input image and neighboring pixels adjacent to the pixels of the input image, wherein the edge enhancement image generating unit adds, to pixels determined to be included in the edge region by the edge region determination unit, the high frequency element value to which the weight is applied.

The edge region determination unit may include: a luminance deviation average value-calculating unit calculating a luminance deviation average value indicating an average value of absolute values of the luminance deviations between the pixels of the input image and the neighboring pixels adjacent to the pixels of the input image; a luminance deviation average value histogram-calculating unit creating a histogram for the luminance deviation average value of the input image; a luminance deviation average value cumulative distribution-calculating unit calculating a cumulative distribution of the luminance deviation average value based on the histogram for the luminance deviation average value; and a binary mask generating unit setting, as a reference value, the luminance deviation average value having a preset number of cumulative distributions in the cumulative distribution of the luminance deviation average value, and generating a binary mask separating a pixel having the luminance deviation average value set to be smaller than the reference value and a pixel having the luminance deviation average value set to be greater than the reference value, wherein the pixel having the luminance deviation average value set to be greater than the reference value is determined as a pixel to be included in the edge region by the binary mask generating unit.

The luminance deviation average value-calculating unit may calculate, as the luminance deviation average value, an average value of absolute values of deviation values between each of the pixels and pixels being in direct contact with each of the pixels in vertical and horizontal directions and a diagonal direction with respect to each of the pixels, by applying a 3×3 mask with respect to each of the pixels.

The binary mask generating unit may determine the preset number of cumulative distributions in a preset ratio for a total number of the pixels of the input image.

The binary mask may be a mask setting, as a white color, the pixel having the luminance deviation average value set to be smaller than the reference value, and setting, as a black color, the pixel having the luminance deviation average value set to be greater than the reference value.

The apparatus may further include a binary mask supplementation unit determining continuity between each of pixels of the binary mask and neighboring pixels adjacent to the pixels of the binary mask, and changing a pixel separation set by the binary mask generating unit, based on a result obtained by determining the continuity.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will be described in detail with reference to the accompanying drawings so that they can be easily practiced by those skilled in the art to which the present invention pertains. Here, the accompanying drawings may be shown in a somewhat exaggerated manner for the description thereof, and may be merely provided as a reference without limiting the scope of the present invention.

Figure 1:
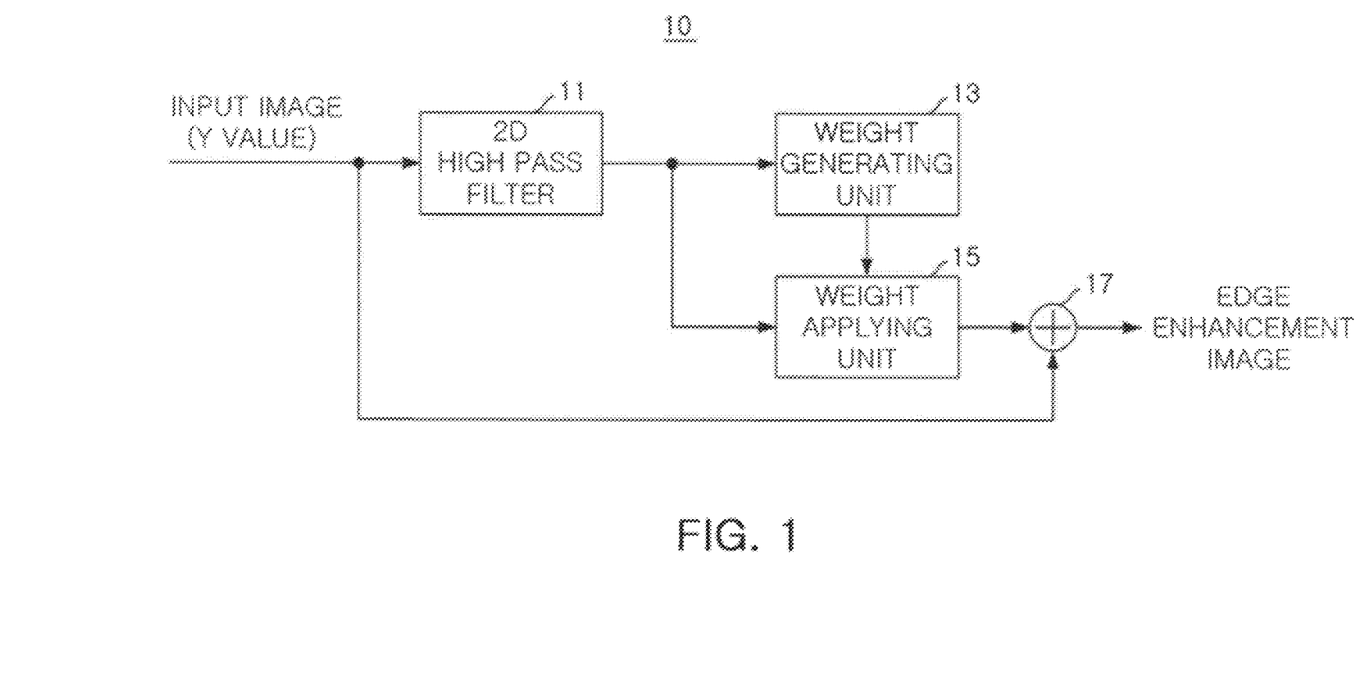
FIG. 1 is a block diagram illustrating an apparatus for improving the sharpness of an image according to an exemplary embodiment of the present invention.

FIG. 1 is a block diagram illustrating an apparatus for improving the sharpness of an image according to an exemplary embodiment of the present invention.

As illustrated in FIG. 1, the apparatus for improving the sharpness of the image according to the present exemplary embodiment may include a two-dimensional (2D) high pass filter (HPF) 11, a weight generating unit 13, a weight applying unit 15, and an edge enhancement image generating unit 17.

The 2D-HPF 11 may output a high frequency element value by applying, to a luminance value (Y value) of each pixel of an input image, a mask constituting the 2D-HPF 11. The high frequency element value outputted by the 2D-HPF 11 may be used for determining the edges of an image. That is, since an edge region of the image has a large-high frequency element value, the high frequency element value may be applied to a part in which the high frequency element value is large, thereby more enhancing the edges.

Figure 2:
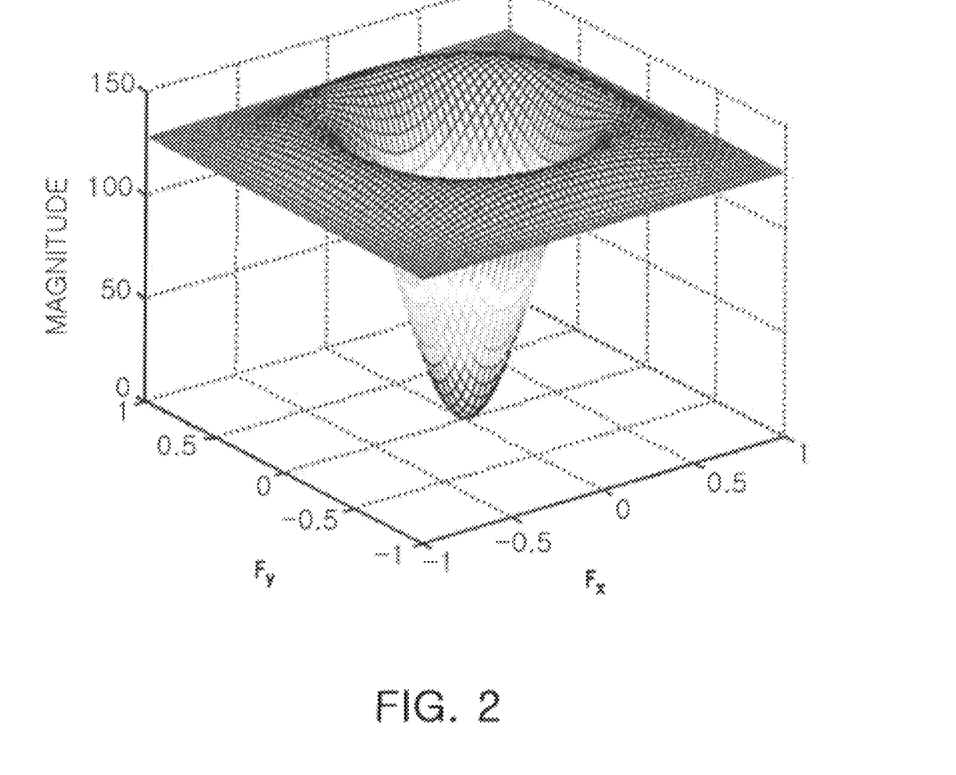
FIG. 2 is a diagram illustrating an example of an applied two-dimensional (2D) high pass filter (HPF) according to an exemplary embodiment of the present invention.

FIG. 2 is a diagram illustrating an example of an applied 2D-HPF according to an exemplary embodiment of the present invention. As illustrated in FIG. 2, a low frequency element close to '0' may be blocked, and a large magnitude is applied in a frequency domain having a large absolute value.

The weight generating unit 13 may generate a weight changed depending on a magnitude of the high frequency element value outputted in the 2D-HPF 11. The high frequency element value determined with respect to each pixel of the input image may be applied to the input image after the weight determined by the weight generating unit 13 is applied.

As described above, the weight generating unit 13 may be changed depending on the magnitude of the high frequency element value. According to an exemplary embodiment, a principle for change of the high frequency element value may be performed such that a low weight is applied to the high frequency element value at more than a predetermined magnitude to prevent excessive edge enhancement from being carried out. For this, according to the present exemplary embodiment, an absolute value of the weight generated in the weight generating unit is increased during which an absolute value of the high frequency element value is increased up to a preset first reference value, and the absolute value of the weight may be reduced during which the absolute value of the high frequency element value is increased beyond the first reference value. That is, with respect to a region having a positive high frequency element value, the weight may be increased during which the high frequency element value is increased up to the first reference value, and the weight may be reduced in an interval in which the high frequency element value is increased beyond the first reference value. Also, when the high frequency element value is increased beyond a predetermined value, the weight may be '0', so that edge enhancement may not be carried out. This principle may be identically applied to a region having a negative high frequency element value.

Figure 3:
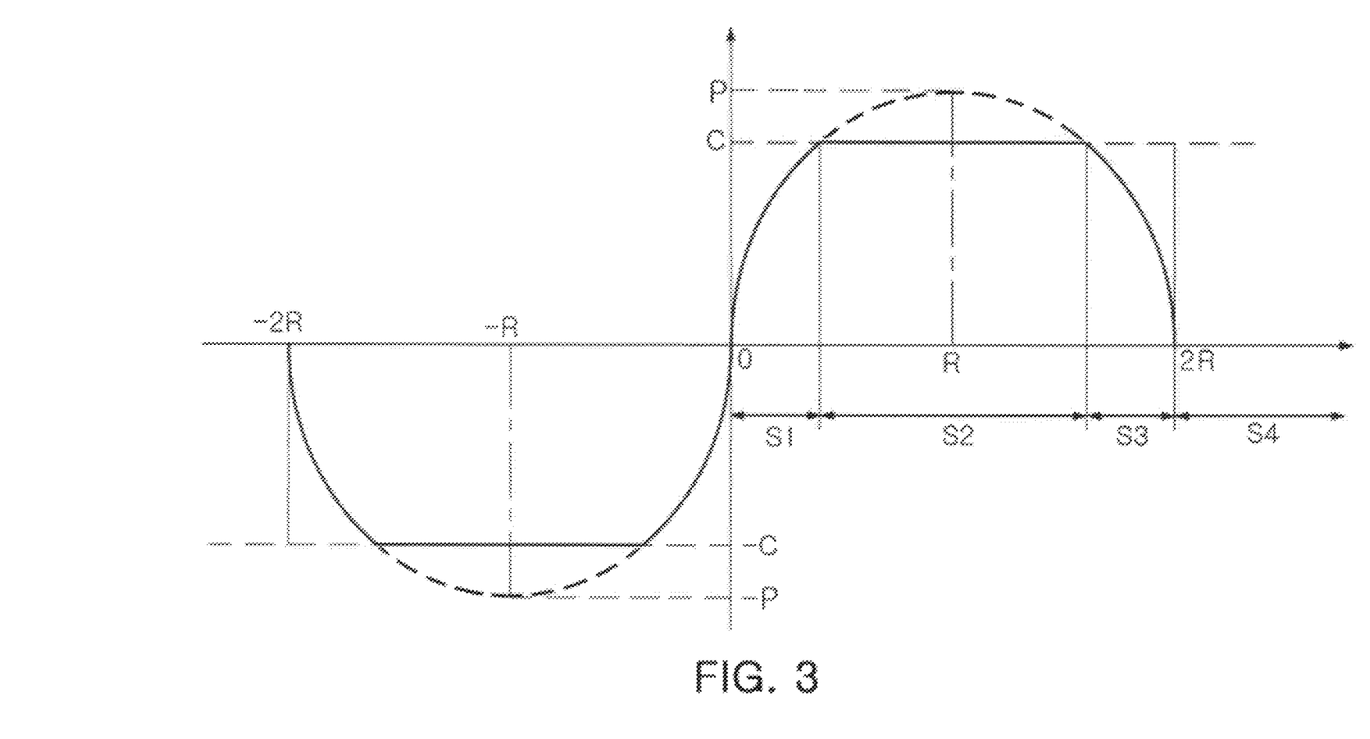
FIG. 3 is a graph illustrating a principle in which a weight of a weight generating unit 13 according to an exemplary embodiment of the present invention is determined.

In this manner, a specific example of an active weight differently applied depending on the high frequency element value is illustrated in FIG. 3.

FIG. 3 is a graph illustrating a principle in which a weight of a weight generating unit 13 according to an exemplary embodiment of the present invention is determined. In FIG. 3, an x-axis denotes a high frequency element value, and a y-axis denotes a weight.

As illustrated in FIG. 3, a weight generated by the weight generating unit 13 may be determined to construct a quadratic curve with the high frequency element value. The weight illustrated in FIG. 3 may be represented as the following Equation 1.

$$w=-a(h-R)^2+P, \text{ if } 0 \leq n \leq 2R$$

$$w=a(h+R)^2-P, \text{ if } -2R \leq h < 0$$

$$w=0, \text{ if } h>2R \text{ or } h<-2R \quad \text{Equation 1}$$

In Equation 1, w denotes weight, h denotes a high frequency element value, and each of a, R, and P denotes an arbitrary constant having a positive value.

Each of a, R, and P, determining a shape of the quadratic curve illustrated in FIG. 3, may be the arbitrary constant having the positive value, and may be appropriately changed in accordance with characteristics of an image in which edge enhancement is carried out. By appropriately adjusting the arbitrary constant, a high quality image having optimum sharpness by the edge enhancement may be generated.

Also, as illustrated in FIG. 3, when an absolute value of the weight generated in the weight generating unit 13 is greater than a second reference value (C), the weight may be maintained to be constant at the second reference value. That is, in the graph of Equation 1 illustrated in FIG. 3, the second reference value (C) may be determined as the weight of a corresponding section in a section (S1) determined as a weight greater than the second reference value (C) or in a section determined as a weight smaller than a negative second reference value (C), thereby preventing an excessive weight from being applied.

The weight applying unit 15 may apply the high frequency element value outputted in the 2D-HPF 11 and the weight applied to a corresponding high frequency element value. The applying of the weight by the weight applying unit 15 may be performed in a scheme of multiplying the weight and the high frequency element value.

The edge enhancement image generating unit 17 may add, to an input image, the high frequency element value in which the weight is applied, thereby generating an image of which edges are enhanced.

As described above, according to an exemplary embodiment of the present invention illustrated in FIG. 1, the weight may be actively changed and set depending on a magnitude of the high frequency element value, thereby preventing an edge element of an image from being excessively enhanced, resulting in suppressing occurrence of distortion or ringing phenomenon.

Figure 4:
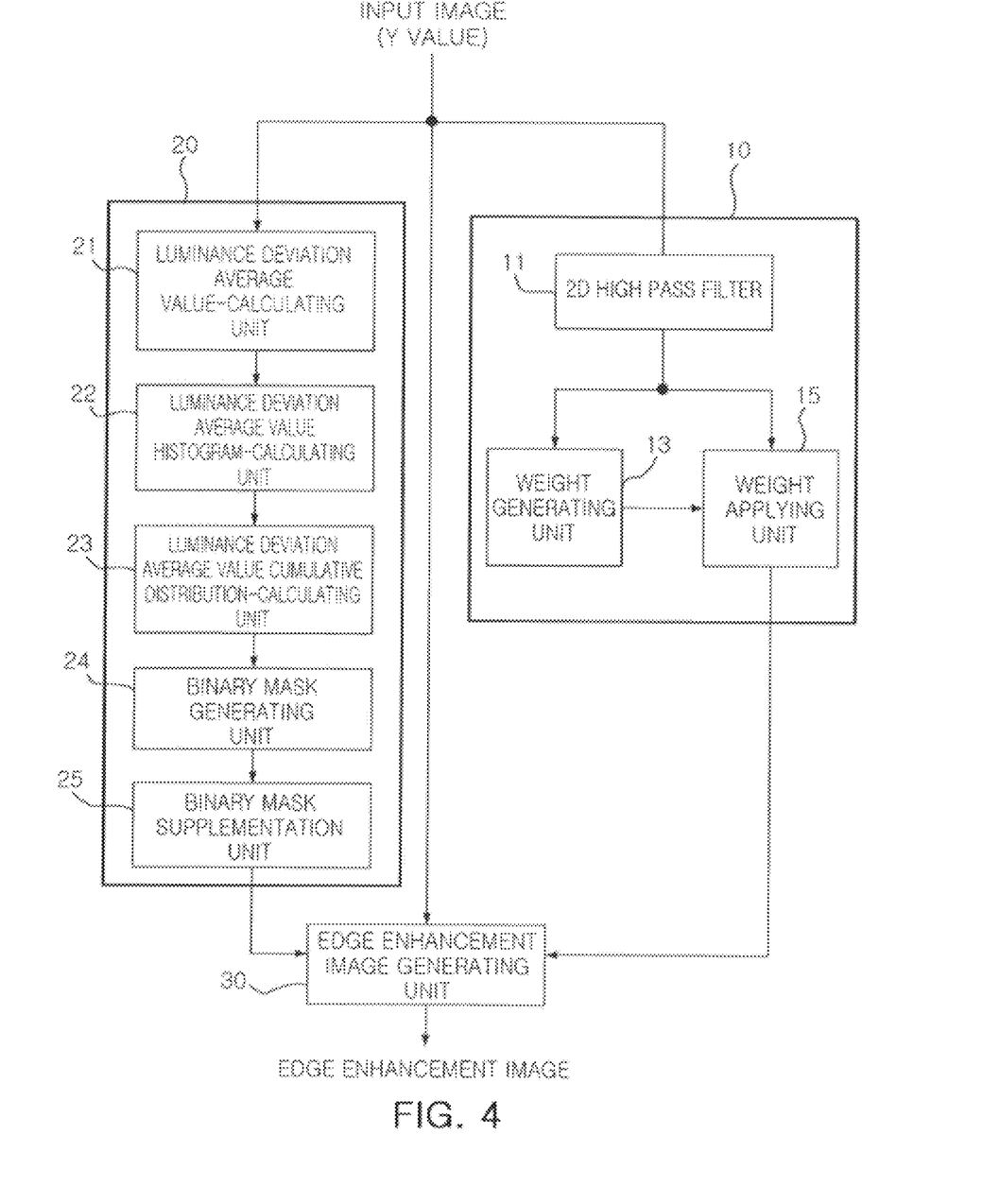
FIG. 4 is a block diagram illustrating an apparatus for improving the sharpness of an image according to another exemplary embodiment of the present invention.

FIG. 4 is a block diagram illustrating an apparatus for improving the sharpness of an image according to another exemplary embodiment of the present invention. The apparatus of FIG. 9 may further include an edge region determination unit 20 determining an edge region of an input image in comparison with the apparatus 10 of FIG. 1. The edge region determination unit 20 may determined whether each pixel of the input image is included in the edge region using a luminance value (Y value) of the input image. The edge enhancement image generating unit 17 may perform an operation of simply adding the luminance value of the input image and the high frequency element value in which the weight is applied; however, the edge enhancement image generating unit 30 of FIG. 4 may perform an operation of adding the high frequency element value in which the weight is applied only to an edge determined as the edge region in the edge region determination unit 20 and to the luminance value of the input image.

In FIG. 4, since a block generating the high frequency element value in which a weight expressed as a reference numeral '10' is applied may have practically the same characteristics and functions as those of components using the same reference numeral as that of FIG. 1, repeated descriptions thereof will be omitted, and the edge region determination unit 20 will herein be described in detail.

The edge region determination unit 20 of FIG. 4 may include a luminance deviation average value-calculating unit 21, a luminance deviation average value histogram-calculating unit 22, a luminance deviation average value cumulative distribution-calculating unit 23, and a binary mask generating unit 24. In addition, the edge region determination unit 20 may further include a binary mask supplementation unit 25.

The luminance deviation average value-calculating unit 21 may calculate a luminance deviation average value indicating an average value of absolute values of deviations of luminance values between each pixel of the input image and neighboring pixel adjacent to the pixel of the input image. Information about the input image inputted to the luminance deviation average value-calculating unit 21 may be a luminance value (Y value) of the input image. The luminance deviation average value-calculating unit 21 may apply a 3×3 mask based on each pixel of the input image as a center of the mask, and calculate, as the luminance deviation average value, an average value of absolute values of deviations with pixels being in direct contact with each pixel of the input image in horizontal and vertical directions and in a diagonal direction.

The luminance deviation average value histogram-calculating unit 22 may create a histogram for the luminance deviation average value of the input image, and the luminance deviation average value cumulative distribution-calculating unit 23 may calculate a cumulative distribution of the luminance deviation average value using the histogram for the luminance deviation average value.

The binary mask generating unit 24 may set, as a reference value, a luminance deviation average value having a preset number of cumulative distributions in the cumulative distribution of the luminance deviation average value, and generate a binary mask separating a pixel having a luminance deviation average value set to be smaller than the reference value and a pixel having a luminance deviation average value set to be greater than the reference value. The binary mask generating unit 24 may determine the preset number of cumulative distributions in a preset ratio with respect to a total number of the pixels of the input image. Also, the binary mask generated in the binary mask generating unit 24 may be a mask setting, as a white color, the pixel having a luminance deviation average value set to be smaller than the reference value, and setting, as a black color, the pixel having the luminance deviation average value set to be greater than the reference value.

The binary mask supplementation unit 25 which can be added in an exemplary embodiment of the present invention may determine continuity between each pixel of the binary mask and neighboring pixels adjacent to each pixel of the binary mask, and change the set pixel separation based on the determined result.

Hereinafter, operations and functional effects of the edge region determination unit 20 will be described in detail with reference to the accompanying drawings.

First, when luminance value information for the input image is inputted to an edge region determination device of a digital image according to an exemplary embodiment of the present invention, the luminance deviation average value-calculating unit 21 may calculate a luminance deviation average value for each pixel of an input image using the luminance value information. The luminance deviation average value may be obtained such that absolute values of luminance deviations between a single pixel of the input image and neighboring pixels adjacent to the single pixel may be obtained, and an average value of the absolute values of the luminance deviations therebetween may be determined as the luminance deviation average value of a corresponding pixel.

Figure 5:
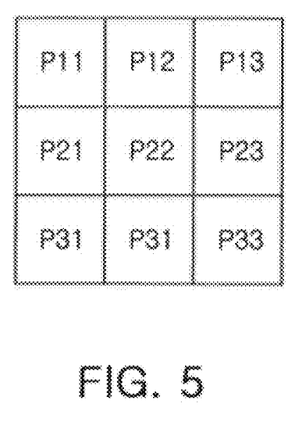
FIG. 5 is a diagram illustrating an example of a 3×3 mask applied in a luminance deviation average value-calculating unit according to an exemplary embodiment of the present invention.

FIG. 5 is a diagram illustrating an example of a 3×3 mask applied to a luminance deviation average value-calculating unit 21 according to an exemplary embodiment of the present invention. The luminance deviation average value-calculating unit 21 may apply the 3×3 mask illustrated in FIG. 5 to each pixel. A target pixel may be a center pixel P22, and an average value of absolute values of luminance deviations of pixels being in direct contact with the target pixel P11, P12, P13, P21, P23, P31, P32, and P33 in horizontal and vertical directions and in a diagonal direction may be the luminance deviation average value of the target pixel P22. For example, in an example of using the mask illustrated in FIG. 5, the luminance deviation average value of the center pixel P22 may be obtained by the following Equation 2.

$$ASAD = \frac{\sum |Ymn - Y22|}{8}$$ Equation 2

In Equation 2, ASAD denotes the luminance deviation average value, m=1, 2, and 3, and n=1, 2, and 3.

Figure 6A:
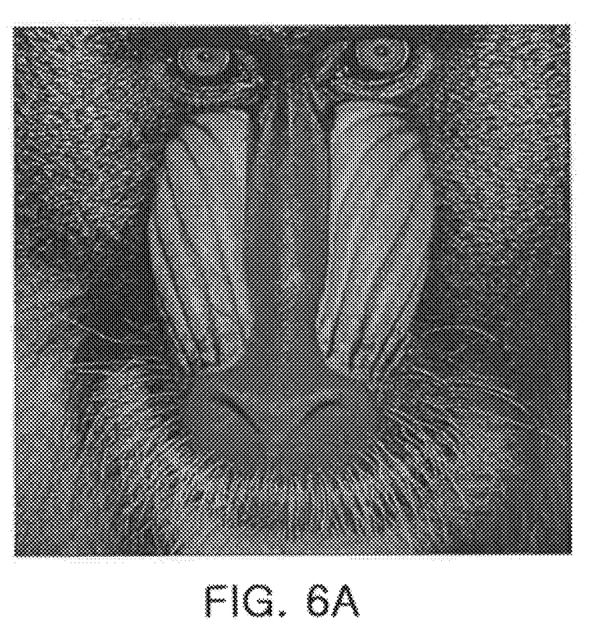
FIG. 6A is a diagram illustrating an input image.
Figure 6B:
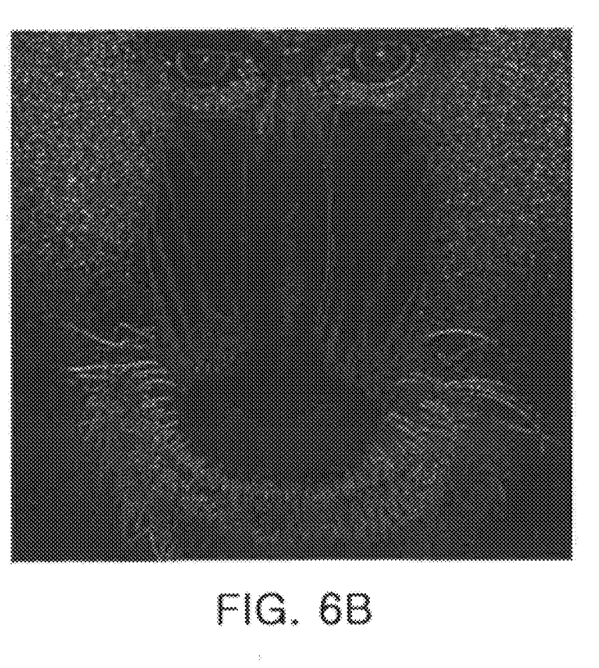
FIG. 6B is a diagram illustrating an image obtaining by replacing each pixel value of the input image with a luminance deviation average value.

FIG. 6A is a diagram illustrating an input image, and FIG. 6B is a diagram illustrating an image obtaining by replacing each pixel value of the input image with a luminance deviation average value.

When calculating a luminance deviation average value in the luminance deviation average value-calculating unit 21 with respect to the input image illustrated in FIG. 6A, and replacing each pixel value of the input image with the luminance deviation average value, the image illustrated in FIG. 6B may be obtained. That is, as illustrated in FIG. 6B, as for the luminance deviation average value, a luminance value may be increased along with an increase in a luminance deviation, and thereby a bright image may be shown in a part in which the luminance deviation is great such as in edges, and a dark image may be shown in a part in which the luminance deviation is small.

Next, the luminance deviation average value histogram-calculating unit 22 may create a histogram for the luminance deviation average value of the input image.

Figure 7A:
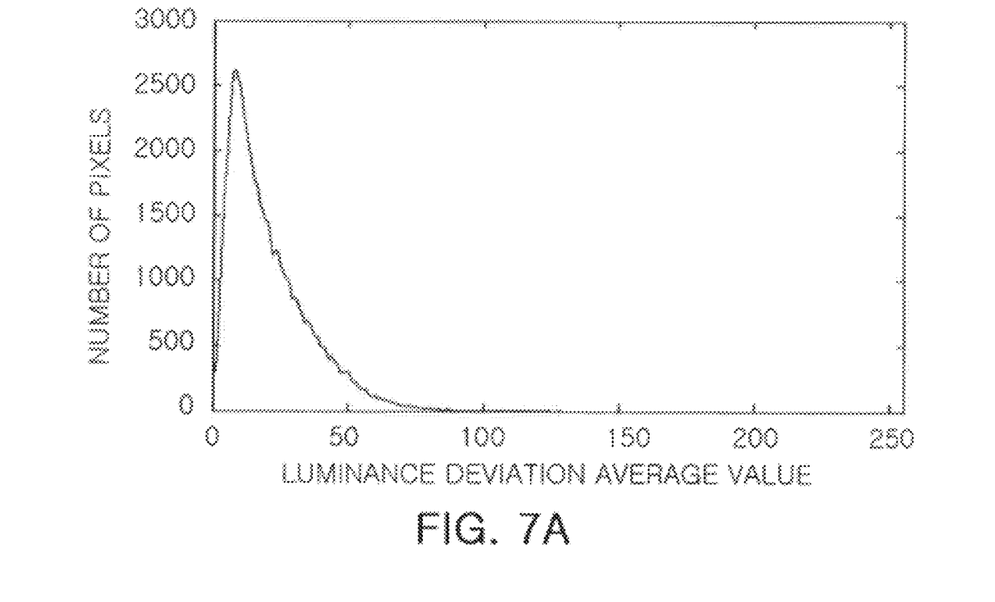
FIG. 7A is a graph illustrating an example of a histogram of an input image with respect to a luminance deviation average value generated by a luminance deviation average value histogram calculating unit of an edge region determination unit according to an exemplary embodiment of the present invention.

FIG. 7A is a graph illustrating an example of a histogram of an input image with respect to a luminance deviation average value. As illustrated in FIG. 7A, in the histogram for the input image with respect to the luminance deviation average value, an x-axis denotes a luminance deviation average value, and a y-axis denotes a number of pixels having a corresponding luminance deviation average value.

Next, the luminance deviation average value cumulative distribution-calculating unit 23 may obtain a cumulative distribution of the luminance deviation average value from the histogram for the luminance deviation average value.

Figure 7B:
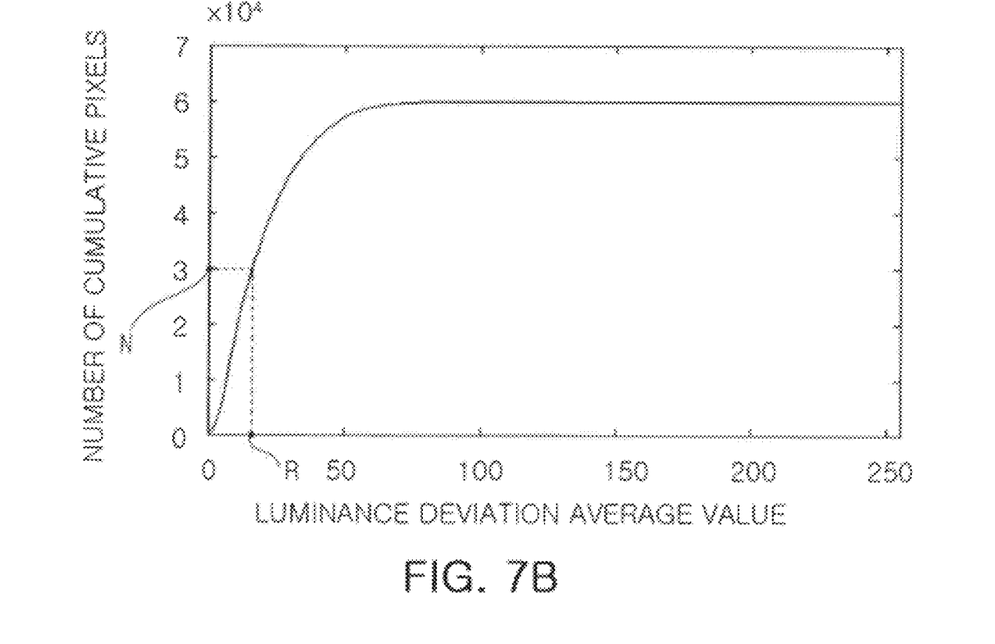
FIG. 7B is a graph illustrating an example of a cumulative distribution histogram of a luminance deviation average value calculated by the histogram of the input image with respect to the luminance deviation average value of FIG. 7A.

FIG. 7B is a graph illustrating a cumulative distribution histogram of the luminance deviation average value calculated by the histogram of the input image with respect to the luminance deviation average value of FIG. 7A. As illustrated in FIG. 7B, in the cumulative distribution histogram of the luminance deviation average value, an x-axis denotes the luminance deviation average value, and a y-axis denotes a sum of a number of pixels having a luminance deviation average value equal to or less than a corresponding luminance deviation average value, that is, denotes a number of cumulative pixels. In FIG. 7B, a number of cumulative pixels of the y-axis corresponding to a maximum value of the luminance deviation average values of the x-axis may be a total number of the pixels of the input image.

Next, the binary mask generating unit 24 may set, as a reference value, a luminance deviation average value having a preset number of cumulative distributions in the cumulative distribution of the luminance deviation average value, and generate a binary mask separating a pixel having a luminance deviation average value set to be smaller than the reference value, and a pixel having a luminance deviation average value set to be greater than the reference value. The binary mask generating unit 24 may determine a number of cumulative distributions for determining the reference value of the luminance deviation average value, in a preset ratio for the total number of the pixels of the input image.

For example, as illustrated in FIG. 7B, when the preset ratio is 0.5 (50%) with respect to an image in which a total number of pixels of the image is 60,000, a number of cumulative pixels for determining the reference value may be 30,000 (see, 'N' of FIG. 7B), and a luminance deviation average value ('R') corresponding to the number of cumulative pixels of 30,000 may be the reference value. Accordingly, the binary mask generating unit 24 may determine that the pixel having the luminance deviation average value set to be smaller than the reference value ('R') has a relatively small luminance deviation value to be determined to not be included in an edge region to thereby set the pixel having the luminance deviation average value as a white color, and the pixel having the luminance deviation average value set to be greater than the reference value ('R') may be determined to be included in the edge region to thereby set the pixel having the luminance deviation average value as a black color.

Figure 8:
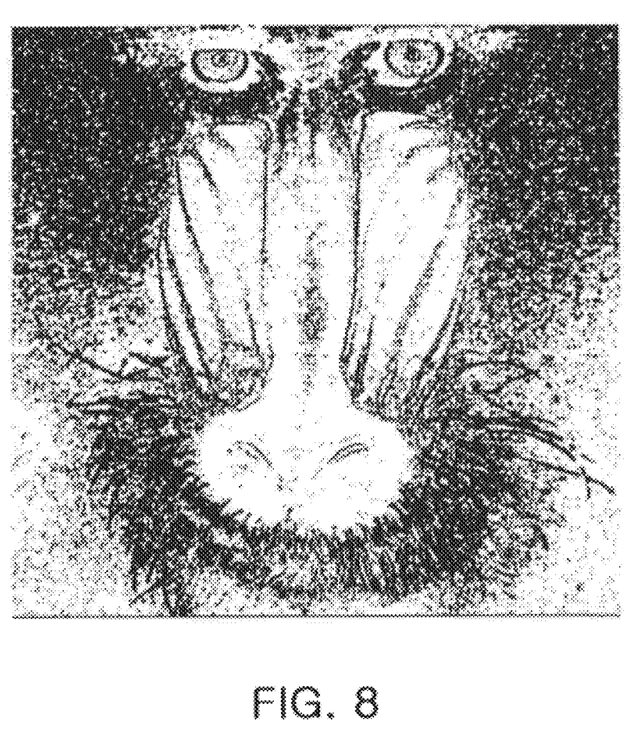
FIG. 8 is a diagram illustrating a binary image generated by a binary mask generating unit of an edge region determination unit according to an exemplary embodiment of the present invention.

FIG. 8 is a diagram illustrating a binary image generated by the binary mask generating unit 24 of the edge region determination unit 20 according to an exemplary embodiment of the present invention. As illustrated in FIG. 8, according to an exemplary embodiment of the present invention, the binary mask separating a part determined as being included in the edge region and a part determined to not be included in the edge region may be generated. In particular, according to an exemplary embodiment of the present invention, a ratio with respect to a total number of pixels of an entire image that is set for determining the reference value may be adjusted to enable the determination of the edge region to be optimally performed.

Next, so that a heavy edge, that is, an edge region excessively shown to generate an awkward image when edge enhancement is carried out, may be removed from the binary mask generated in the binary mask generating unit 24, and a natural image may be generated while maintaining continuity between each pixel of the binary mask and neighboring pixels adjacent to each pixel of the binary mask, the binary mask supplementation unit 25 may be adopted. The binary mask supplementation unit 25 may determine the continuity between each pixel of the binary mask and the neighboring pixels, and may change the pixel separation set by the binary mask generating unit based on the determined result.

FIGS. 9A to 9D are diagrams illustrating examples of pixel continuity-determination applied by the binary mask supplementation unit 25. As illustrated in FIGS. 9A to 9D, a 3×5 mask may be used to enable a significant amount of internal information of the binary mask to be used while minimizing use of a line memory.

Figure 9A:
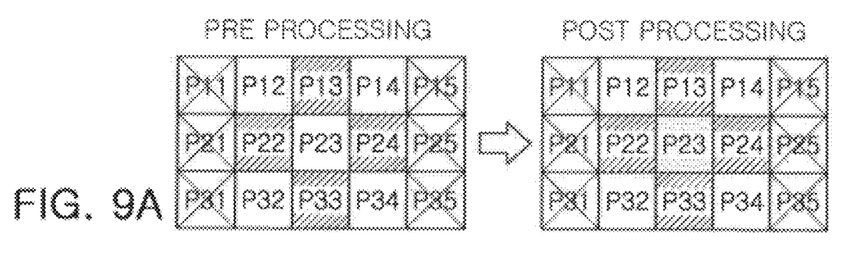
FIGS. 9A to 9D are diagrams illustrating examples of pixel continuity-determination applied by a binary mask supplementation unit of an edge region determination unit according to an exemplary embodiment of the present invention.

As illustrated in FIG. 9A, before applying the binary mask supplementation unit 25, a center pixel P23 surrounded by edge region pixels P13, P22, P24, and P33 may be changed as the edge region pixel in the same manner as that in neighboring pixels by the binary mask supplementation unit 25.

Figure 9B:
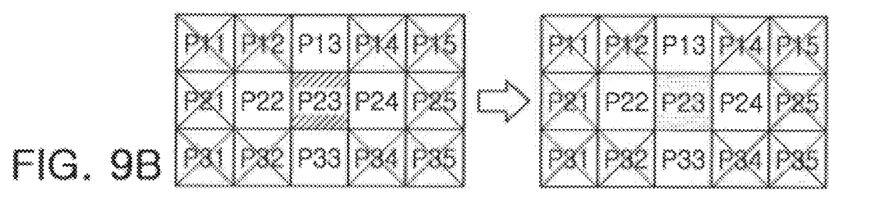

Also, as illustrated in FIG. 9B, before applying the binary mask supplementation unit 25, a center pixel P23 surrounded by pixels P13, P22, P24, P33 different from the edge region pixel may be changed as a pixel different from the edge region pixel in the same manner as that in the neighboring pixels by the binary mask supplementation unit 25.

Figure 9C:
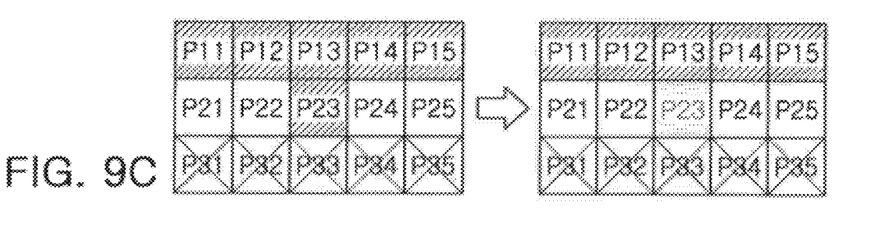

Also, as illustrated in FIG. 9C, before applying the binary mask supplementation unit 25, a pixel P23 in which each of upper line pixels P11, P12, P13, P14, and P15 is the edge region pixel and each of remaining pixels P21, P22, P24, and P25 of a line including the pixel P23 is not the edge region pixel may be changed from the edge region pixel to a pixel different from the edge region pixel in order to maintain continuity of the edge region formed by the upper line pixels.

Figure 9D:
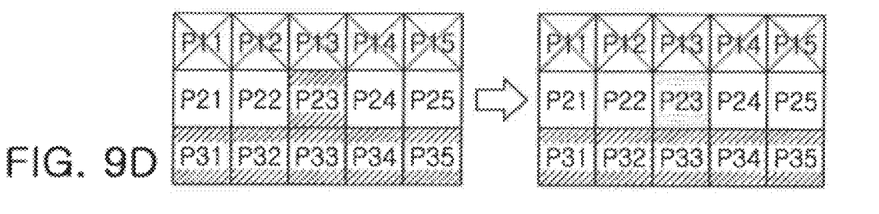

Similarly, as illustrated in. FIG. 9D, before applying the binary mask supplementation unit 25, a pixel P23 in which each of lower line pixels P31, P32, P33, P34, and P35 is the edge region pixel and each of remaining pixels P21, P22, P24, and P25 of a line including the pixel P23 is not the edge region pixel may be changed from the edge region pixel to a pixel different from the edge region pixel in order to maintain continuity of the edge region formed by the lower line pixels.

Figure 10:
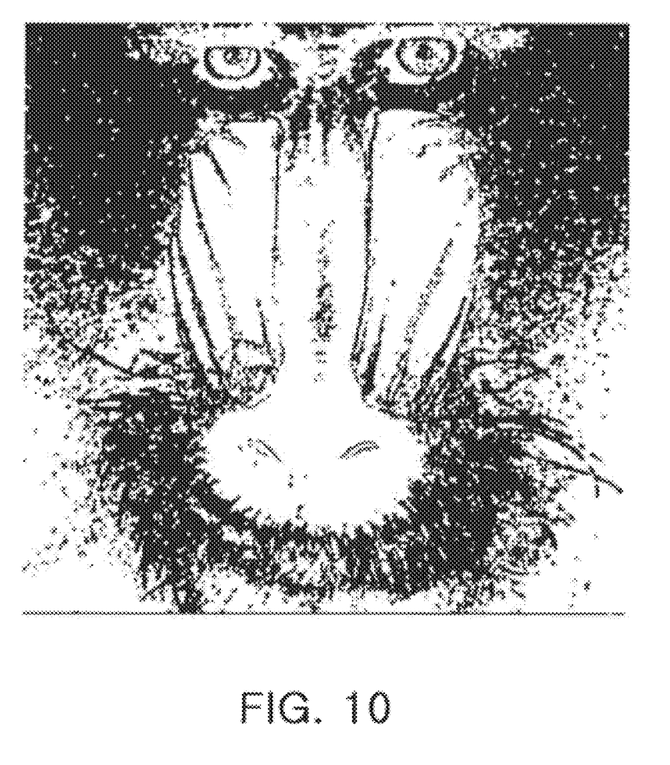
FIG. 10 is a diagram illustrating a binary image to which a binary mask supplementation unit of an edge region determination unit according to an exemplary embodiment of the present invention is applied.

FIG. 10 is a diagram illustrating a binary image to which the binary mask supplementation unit 25 of the edge region determination unit 20 according to an exemplary embodiment of the present invention is applied. When compared with FIG. 8, it may be seen that a heavy edge may be removed from the binary image of FIG. 10 to which the binary mask supplementation unit 25 is applied, and continuity of the image may be improved.

As set forth above, according to exemplary embodiments of the present invention, it may be possible to prevent excessive enhancement of an edge element of an image from being carried out by actively changing and setting a weight depending on a magnitude of a high frequency element value, thereby preventing occurrence of distortion or a ringing phenomenon.

Also, according to exemplary embodiments of the present invention, by adopting the edge region determination unit 20, it may be possible to more accurately determine whether each of the pixels is included in the edge region by generating a binary mask using an average value of luminance deviations between each of pixels of a digital image and a neighboring pixel adjacent to the pixels of the digital image.

Also, according to exemplary embodiments of the present invention, since the edge enhancement image generating unit 30 may apply, to only a pixel determined to be included in the edge region, the high frequency element value in which the weight is applied, it may be possible to omit a process of adding the high frequency element value to an image different from the edge, thereby preventing occurrence of distortion of the image.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for improving the sharpness of an image, the apparatus comprising:
   a two-dimensional high pass filter configured to output a high frequency element value for luminance values of pixels of an input image;
   a weight generating unit configured to generate a weight changed depending on a magnitude of the high frequency element value;
   a weight applying unit configured to apply the weight to the high frequency element value; and
   an edge enhancement image generating unit configured to add, to the luminance values of the pixels of the input image, the high frequency element value to which the weight is applied and output an image of which an edge is enhanced,
   wherein an absolute value of the weight generated by the weight generating unit is increased during an absolute value of the high frequency element value is increased up to a preset first reference value, and is reduced during the absolute value of the high frequency element value is increased beyond the first reference value.

2. An apparatus for improving the sharpness of an image, the apparatus comprising:
   a two-dimensional high pass filter configured to output a high frequency element value for luminance values of pixels of an input image;
   a weight generating unit configured to generate a weight changed depending on a magnitude of the high frequency element value;
   a weight applying unit configured to apply the weight to the high frequency element value; and
   an edge enhancement image generating unit configured to add, to the luminance values of the pixels of the input image, the high frequency element value to which the weight is applied and output an image of which an edge is enhanced, wherein the weight generating unit is configured to generate the weight based on Equation 1, $$w=-a(h-R)^2+P, \text{ if } 0 \leq h \leq 2R$$

$$w=a(h+R)^2-P, \text{ if } -2R \leq h < 0$$

$$w=0, \text{ if } h>2R \text{ or } h<-2R \qquad \text{Equation 1,}$$

where w denotes the weight, h denotes the high frequency element value, and each of a, R, and P denotes an arbitrary constant having a positive value.

3. The apparatus of claim 1, wherein when the weight generated by the weight generating unit is greater than a second reference value, the absolute value of the weight is clamped at the second reference value.

4. The apparatus of claim 2, wherein when the weight generated by the weight generating unit is greater than a second reference value, the absolute value of the weight is clamped at the second reference value.

5. An apparatus for improving the sharpness of an image, the apparatus comprising:
   a two-dimensional high pass filter configured to output a high frequency element value for luminance values of pixels of an input image;
   a weight generating unit configured to generate a weight changed depending on a magnitude of the high frequency element value;
   a weight applying unit configured to apply the weight to the high frequency element value:
   an edge enhancement image generating unit configured to add, to the luminance values of the pixels of the input image, the high frequency element value to which the weight is applied and output an image of which an edge is enhanced; and
   an edge region determination unit configured to determine whether or not each of the pixels of the input image is included in an edge region in accordance with a luminance deviation between each of the pixels of the input image and neighboring pixels adjacent to the pixels of the input image,
   wherein the edge enhancement image generating unit is configured to add, to pixels determined to be included in the edge region by the edge region determination unit, the high frequency element value to which the weight is applied.

6. The apparatus of claim 5, wherein the edge region determination unit includes:
   a luminance deviation average value-calculating unit configured to calculate a luminance deviation average value indicating an average value of absolute values of the luminance deviations between the pixels of the input image and the neighboring pixels adjacent to the pixels of the input image;
   a luminance deviation average value histogram-calculating unit configured to create a histogram for the luminance deviation average value of the input image;
   a luminance deviation average value cumulative distribution-calculating unit configured to calculate a cumulative distribution of the luminance deviation average value based on the histogram for the luminance deviation average value; and
   a binary mask generating unit configured to set, as a reference value, the luminance deviation average value having a preset number of cumulative distributions in the cumulative distribution of the luminance deviation average value and generate a binary mask separating a pixel having the luminance deviation average value set to be smaller than the reference value and a pixel having the luminance deviation average value set to be greater than the reference value,
   wherein the pixel having the luminance deviation average value set to be greater than the reference value is determined as a pixel to be included in the edge region by the binary mask generating unit.

7. The apparatus of claim 6, wherein the luminance deviation average value-calculating unit is configured to calculate, as the luminance deviation average value, an average value of absolute values of deviation values between each of the pixels and pixels being in direct contact with each of the pixels in vertical and horizontal directions and a diagonal direction with respect to each of the pixels, by applying a 3×3 mask with respect to each of the pixels.

8. The apparatus of claim 6, wherein the binary mask generating unit is configured to determine the preset number of cumulative distributions in a preset ratio for a total number of the pixels of the input image.

9. The apparatus of claim 6, wherein the binary mask includes a mask setting, as a white color, the pixel having the luminance deviation average value set to be smaller than the reference value, and setting, as a black color, the pixel having the luminance deviation average value set to be greater than the reference value.

10. The apparatus of claim 6, further comprising:
    a binary mask supplementation unit configured to determine continuity between each of pixels of the binary mask and neighboring pixels adjacent to the pixels of the binary mask and change a pixel separation set by the binary mask generating unit, based on a result obtained by determining the continuity.

* * * * *